US011310897B2

(12) United States Patent
Gorczyca et al.

(10) Patent No.: US 11,310,897 B2
(45) Date of Patent: Apr. 19, 2022

(54) METHOD AND APPARATUS FOR AN IONIZED AIR BLOWER (71) Applicant: Illinois Tool Works Inc., Glenview, IL (US)

(72) Inventors: John A. Gorczyca, Lansdale, PA (US); Steven J. Mandrachia, Eagleville, PA (US); Manuel C. Blanco, Hillsborough, NJ (US); Richard D. Rodrigo, Chalfont, PA (US)

(73) Assignee: Illinois Tool Works Inc., Glenview, IL (US)

( * ) Notice: Subject to any disclaimer, the term of this patent is extended or adjusted under 35 U.S.C. 154(b) by 58 days.

(21) Appl. No.: 16/591,846

(22) Filed: Oct. 3, 2019

(65) Prior Publication Data
US 2020/0113036 A1 Apr. 9, 2020

Related U.S. Application Data (60) Provisional application No. 62/742,652, filed on Oct. 8, 2018.

(51) Int. Cl.
*H05F 3/06* (2006.01)
*B08B 1/00* (2006.01)
(Continued)

(52) U.S. Cl.
CPC .............. *H05F 3/06* (2013.01); *B08B 1/002* (2013.01); *G05B 19/054* (2013.01); *H01T 23/00* (2013.01)

(58) Field of Classification Search
CPC ......... H05F 3/06; B08B 1/002; G05B 19/054; H01T 23/00; F24F 8/30; F24F 2221/22;
(Continued)

(56) References Cited

U.S. PATENT DOCUMENTS

2005/0210902 A1 9/2005 Parker
2009/0207547 A1* 8/2009 Terasaki .................. H01T 19/04
361/231
2012/0221150 A1 8/2012 Arensmeier

FOREIGN PATENT DOCUMENTS

EP 1067828 1/2001
EP 2061124 5/2009
(Continued)

OTHER PUBLICATIONS

Good; Title: instantaneous balance control scheme for ionizer; specification and drawings (Year: 2001).*
(Continued)

*Primary Examiner* — Dharti H Patel
(74) *Attorney, Agent, or Firm* — McAndrews, Held & Malloy, Ltd.

(57) ABSTRACT

Various aspects of the disclosure provides for an ionized air blower that can be used to neutralize static charge on a target surface or provide a charge on the target surface. The ionized air blower may comprise a fan configured to generate airflow toward a target surface, an ionizer configured to produce positive ions and negative ions in the airflow, and control circuitry. The control circuitry is configured to control one or both of a speed of the airflow from the blower and ionization of the airflow. The ionization is performed by a selected one of ion imbalanced mode or ion balanced mode of the blower.

19 Claims, 10 Drawing Sheets (51) Int. Cl.
  *G05B 19/05* (2006.01)
  *H01T 23/00* (2006.01)
(58) Field of Classification Search
  CPC .... F24F 3/16; F24F 11/32; F24F 11/52; F24F 11/65; F24F 11/74
  USPC .......................................................... 361/213
  See application file for complete search history.

(56) References Cited

FOREIGN PATENT DOCUMENTS

| | | |
|---|---|---|
| JP | 2003017293 | 1/2003 |
| WO | 2013119283 | 8/2013 |

OTHER PUBLICATIONS

Int'l Search Report and Written Opition Appln No. PCT/US2019/054754 dated Jan. 27, 2020.

\* cited by examiner

METHOD AND APPARATUS FOR AN IONIZED AIR BLOWER

CLAIM OF PRIORITY

This patent application makes reference to, claims priority to and claims benefit from U.S. Provisional Patent Application Ser. No. 62/742,652, filed on Oct. 8, 2018. The above identified application is hereby incorporated herein by reference in its entirety.

BACKGROUND

The present disclosure relates to an air blower, and more particularly, to a method and apparatus for an ionized air blower.

Limitations and disadvantages of conventional systems for an ionization device will become apparent to one of skill in the art, through comparison of such approaches with some aspects of the present method and system set forth in the remainder of this disclosure with reference to the drawings.

SUMMARY

Methods and systems are provided for an ionized air blower, substantially as illustrated by and described in connection with at least one of the figures, as set forth more completely in the claims.

BRIEF DESCRIPTION OF THE DRAWINGS

These and/or other aspects will become apparent and more readily appreciated from the following description of some example embodiments, taken in conjunction with the accompanying drawings.

The drawings are not necessarily to scale. Where appropriate, similar or identical reference numbers are used to identify similar or identical elements.

DETAILED DESCRIPTION

Various aspects of the disclosure may provide for an ionized air blower that may be used to neutralize static charge on a target surface, or provide a charge on the target surface. Some objects, such as, for example, rolls of plastic sheets or newspaper sheets may have static charge on its surface neutralized. Other objects, such as, for example, plastic bags or pages of magazines may be statically charged to keep the bags or pages together. Other aspects of the disclosure may provide ionized air to, for example, filter particulates in the environment.

Figure 1A:
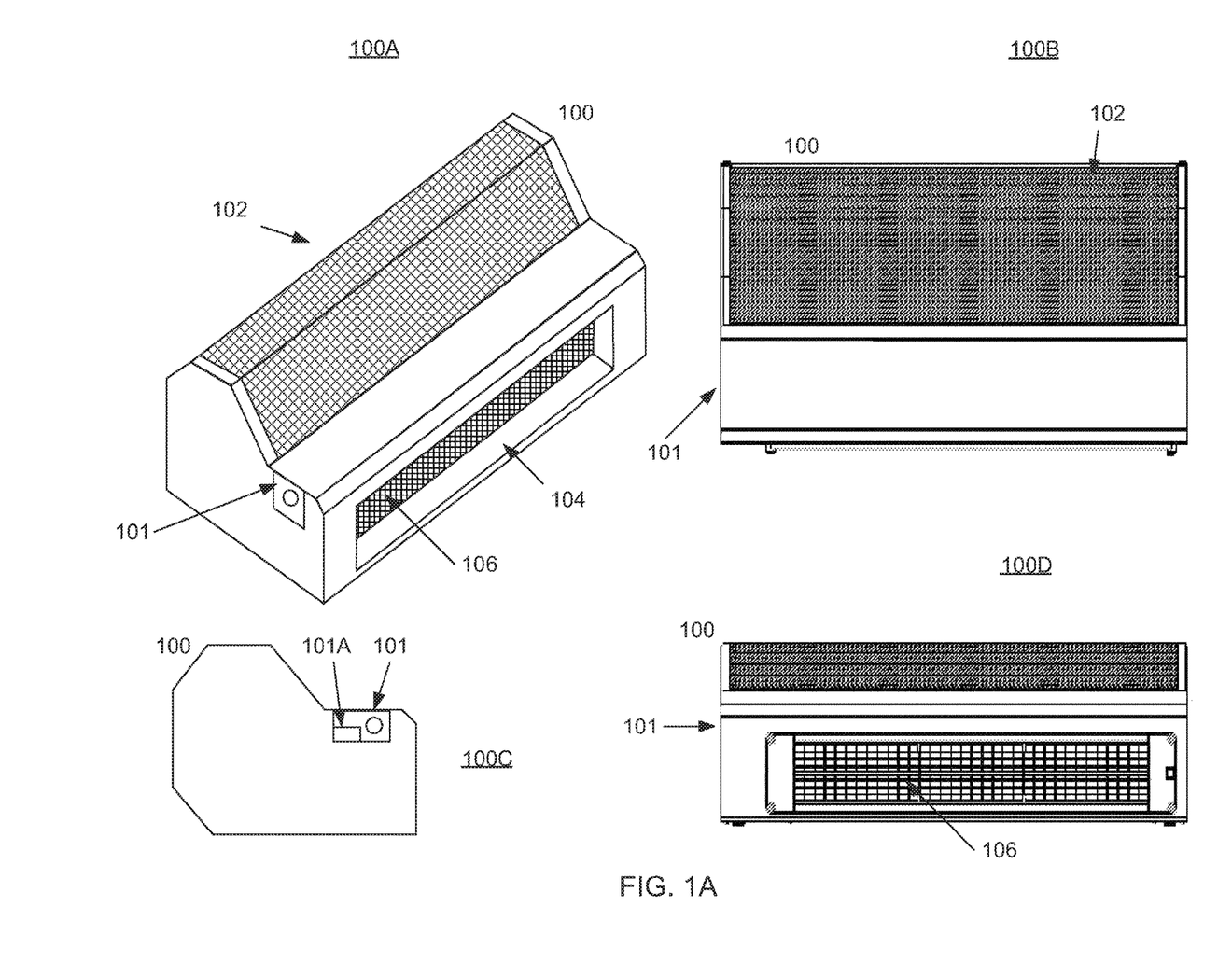
FIG. 1A illustrates multiple views of an example ionized air blower, in accordance with aspects of the disclosure.

FIG. 1A provides various views of an example ionized air blower. There is shown in a perspective view 100A an example ionized air blower 100 with an air intake area 102 and an air exit area 104. The air may be drawn in by, for example, a fan. A fan 400 shown in FIG. 4 may be used in various aspects of the disclosure. Other aspects of the disclosure may disclose using other types of fans or devices for moving air.

Figure 3A:
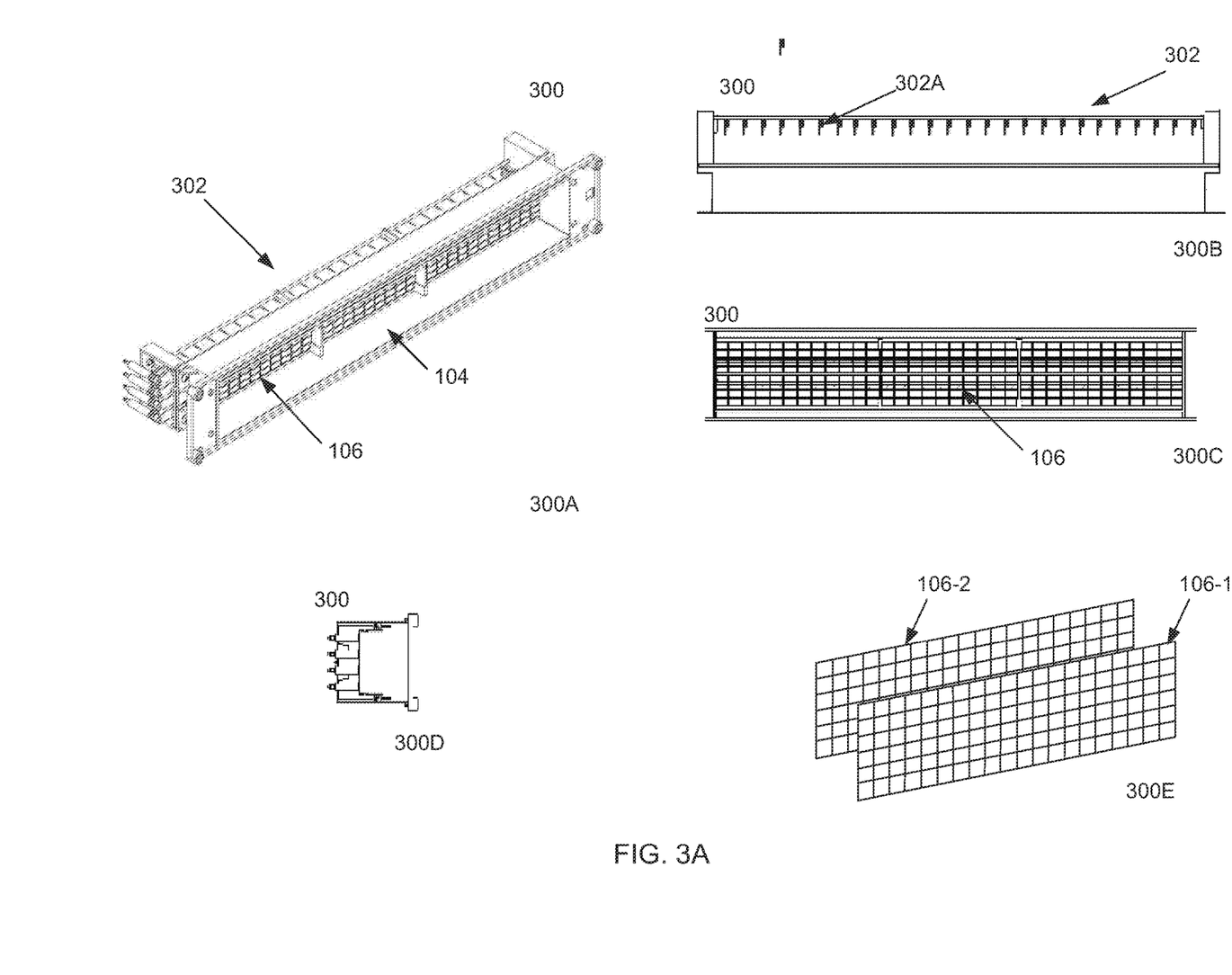
FIG. 3A provides various views of an output section of an ionized air blower, in accordance with aspects of the disclosure.

The air may be ionized by, for example, ionizer 302 shown in FIG. 3A. The air exit area 104 may also have a sensor 106 that is configured to determine a net charge of the air flowing past the sensor 106. The sensor may be a part of a grille or separate from the grille. While the sensor 106 is shown as one device, various aspects of the disclosure may provide for a separate grille and sensor. For example, the sensor 106 may be formed in the shape of a grille, a sensor and a grille may be permanently coupled together to form a single part, or a sensor and a grille may be overlaid on top of each other so they can be separated from each other. A sensor coupled/overlaid with a grille may be referred to as either a sensor or a sensor assembly.

Figure 1B:
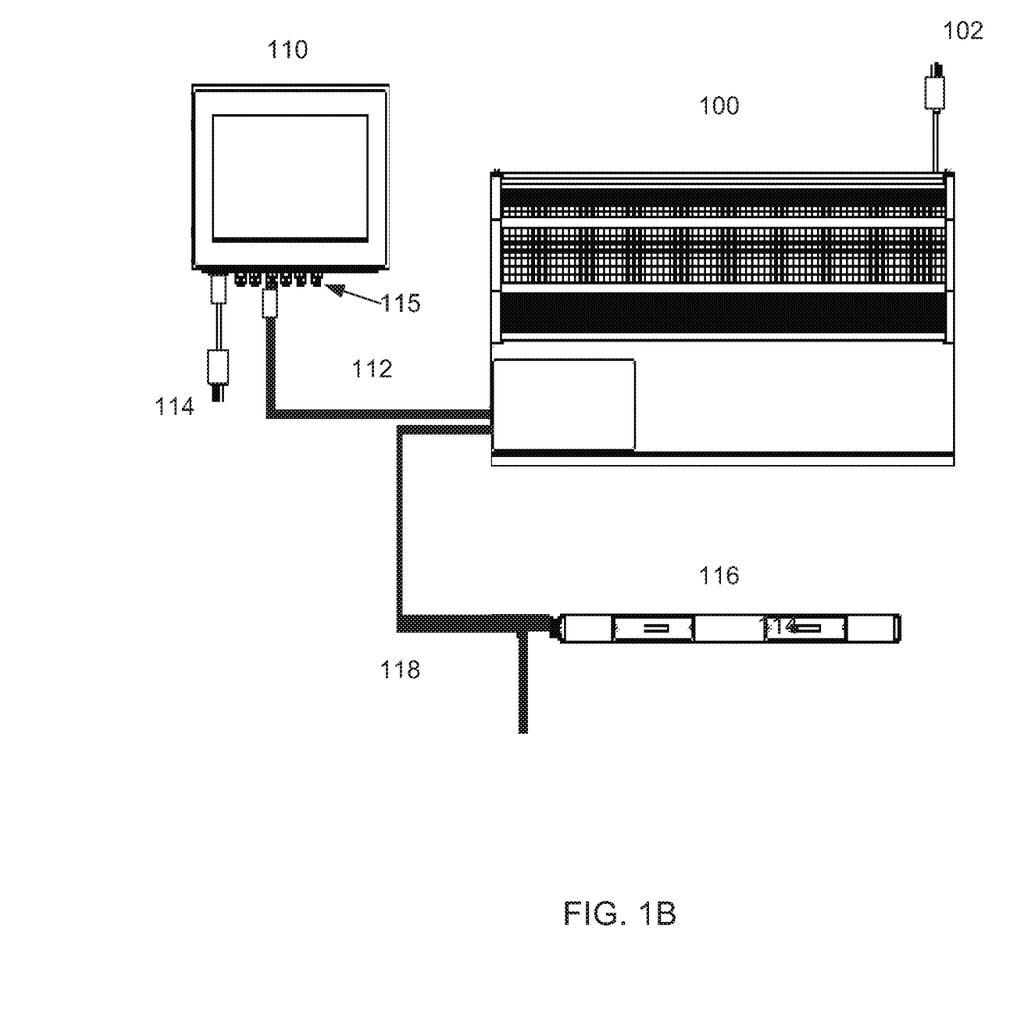
FIG. 1B is a drawing illustrating the example ionized air blower of FIG. 1A with a control station and a sensor, in accordance with aspects of the disclosure.
Figure 1C:
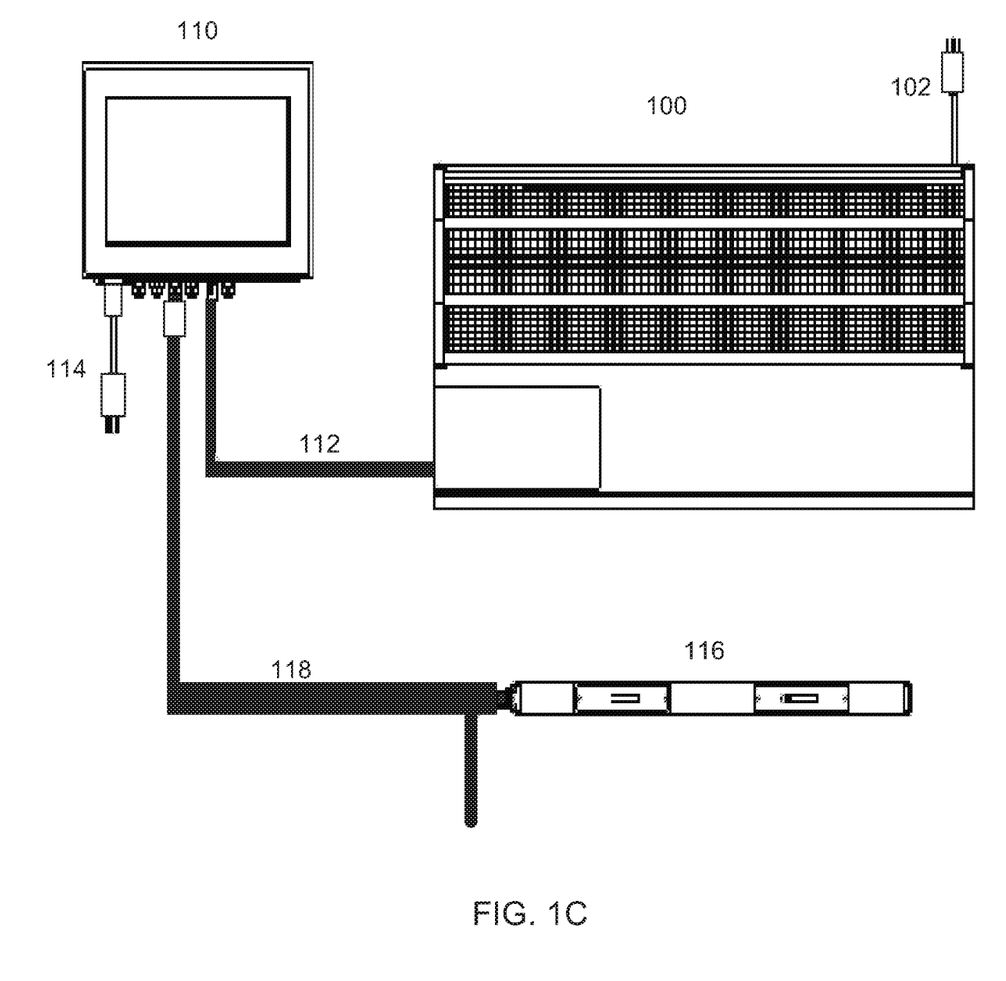
FIG. 1C is another drawing illustrating the example ionized air blower of FIG. 1A with a control station and a sensor, in accordance with aspects of the disclosure.
Figure 1D:
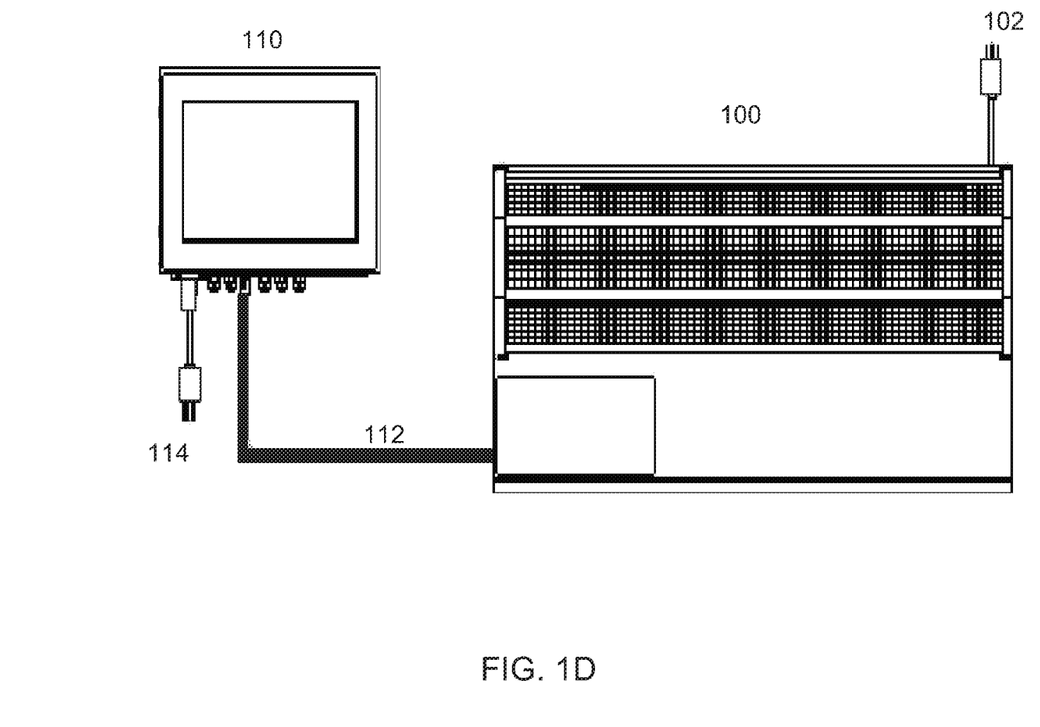
FIG. 1D is a drawing illustrating the example ionized air blower of FIG. 1A with a control station, in accordance with aspects of the disclosure.
Figure 1E:
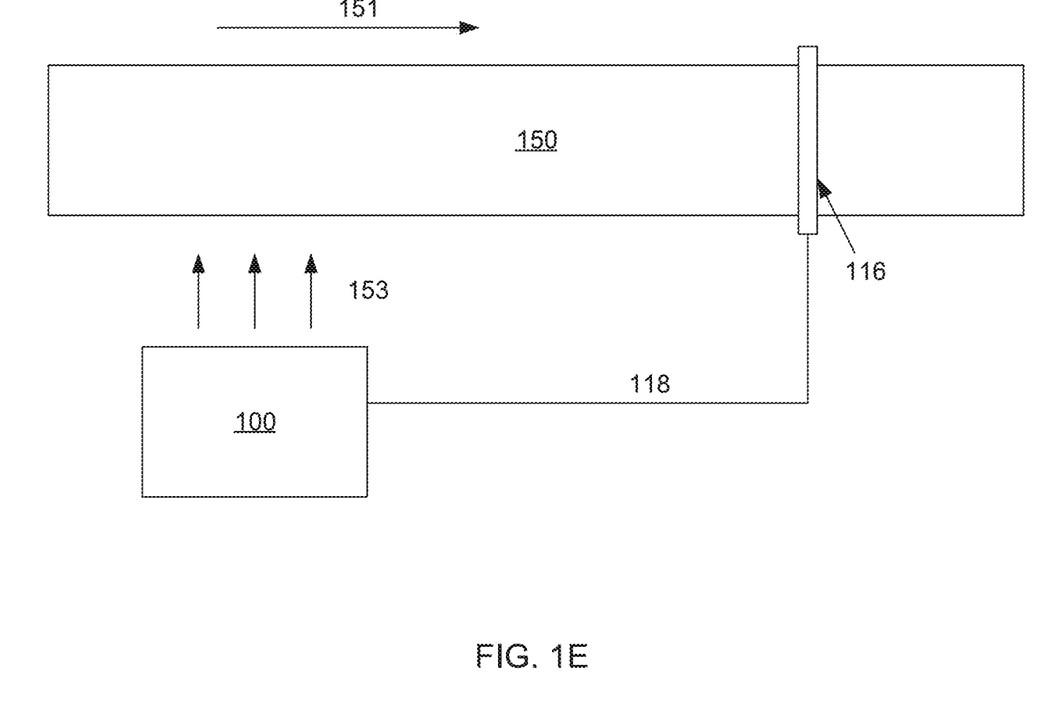
FIG. 1E is a drawing of an example configuration of the example ionized air blower of FIG. 1A blowing air on to a target surface, in accordance with aspects of the disclosure.

The sensor 106 may be, for example, an electro-static voltmeter that is configured to determine the surface charge of a target object 150 shown in FIG. 1E. Alternatively, the sensor 106 may be, for example, an electro-static field meter that may be configured to determine a surface charge of the target object 150. Additionally, any other device that is suitable for determining a surface charge of the target object 150 may be used.

There is also shown a top view 100B of the example ionized air blower 100, a side view 100C of the example ionized air blower 100, and a front view 100D of the example ionized air blower 100.

The various components of the ionized air blower 100 may be controlled by, for example, a blower control circuitry 101. For example, the blower control circuitry 101 may control the speed of the fan 400 as well as ionization of air provided the ionized air blower 100. The blower control circuitry 101 may comprise connectors on the connector panel 101A to connect to at least one cable to communicate information from the sensor 106 to external devices such as, for example, a control station 110 shown in FIGS. 1B-1D. The control station 110 may be used to control various devices as well as to display information about the control station 110 and the status of the devices connected to the control station 110. The communication may be wired and/or wireless. The blower control circuitry 101 connectors may generally be used to communicate sensor information as well as other information.

FIG. 1B is a drawing illustrating the example ionized air blower of FIG. 1A with a control station 110 and an external sensor 116. The external sensor 116 may be connected via a cable 118 to the ionized air blower 100 at the connector panel 101A. The cable 112 may then be used to communicate the information from the external sensor 116 to the control station 110. The cable 112 may also be used to communicate information from the sensor 106 at the exit area 104 to the control station 110. The power plugs 102 and 114 may be used to provide power to the ionized air blower 100 and the control station 110, respectively. However, various aspects of the disclosure may disclose only one of the power plugs 102, 114, and any necessary power may be provided from the ionized air blower 100 to the control station 110, or vice versa. Cables may connect to the control station 110 via the connectors 115.

Various aspects of the disclosure may provide for some of the functionality of the blower control circuitry 101 to be a part of the control station 110.

FIG. 1C is another drawing illustrating the example ionized air blower of FIG. 1A with a control station and a sensor. Referring to FIG. 1C, there is shown the external sensor 116 connected directly to the control station 110 rather than via the ionized air blower 100. Accordingly, control station 110 receives information from the sensor 106 via the cable 112 and information from the external sensor 116 via the cable 118.

FIG. 1D is a drawing illustrating the example ionized air blower of FIG. 1A with a control station. Referring to FIG. 1D, the hub sensor 110 receives information from the sensor 106 via the cable 112. There is no external sensor 116 in this configuration. This may be because, for example, the ionized air blower 100 is configured to provide a fixed ratio of negative ions to positive ions. Accordingly, there is no need to determine the surface charge of the target surface 150 (FIG. 1E) with the external sensor 116.

Accordingly, the control station 110 may have a plurality of connectors to connect to the various cables carrying information from the sensors 106 and 116.

While the control station 110 is shown as being separate from the ionizing blower 100, various aspects of the disclosure may provide for the control station 110 to be integrated with the blower 100. The control station 110 may then include the blower control circuitry 101. The control station 110 may have some or all functionality of a control circuitry 200, which is described in more detail with respect to FIG. 2. Various aspects of the disclosure may also allow the blower control circuitry 101 to have some or all functionality of the control circuitry 200.

FIG. 1E is a drawing of an example configuration of the example ionized air blower of FIG. 1A blowing air on to a target surface. Referring to FIG. 1E, there are shown a target surface 150 moving in the direction shown by the arrow 151, the external sensor 116 that is configured to determine the surface charge of the target surface 150, and the ionized air blower 100 that provides an airflow 153 of ionized air onto the target surface 150. The ionization of the air blown onto the target surface 150 is adjusted based on feedback from the external sensor 116. Various aspects of the disclosure may also take into account the information from the sensor 106 by correlating the present ionization of the airflow 153 with the surface charge of the target surface 150.

Figure 1F:
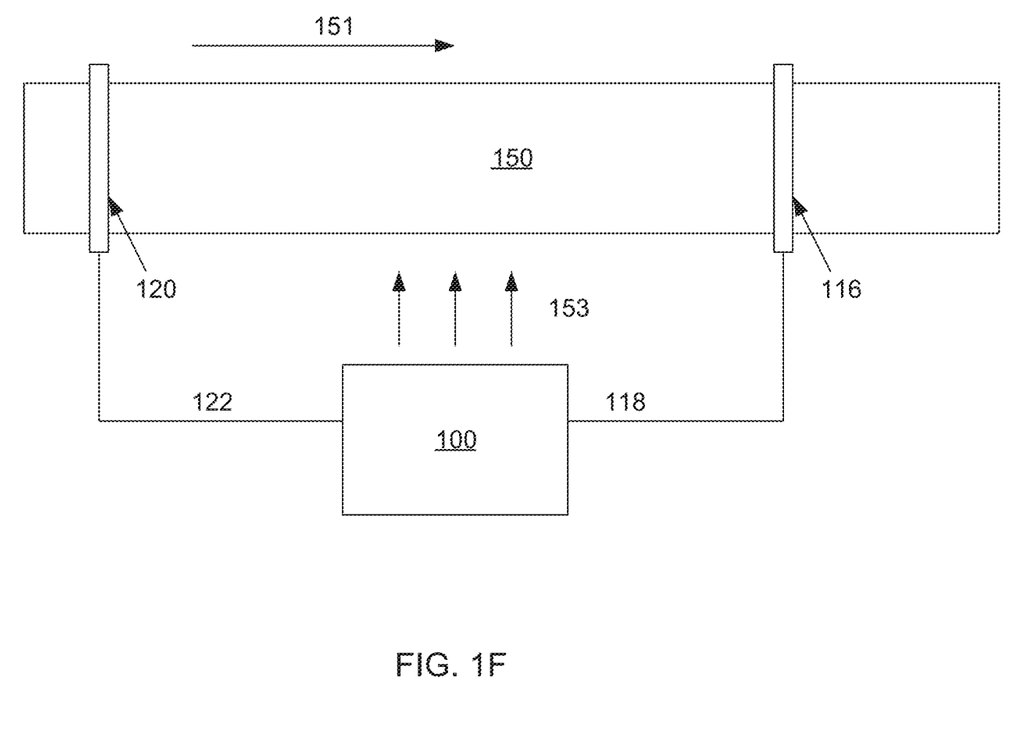
FIG. 1F is a drawing of another example configuration of the example ionized air blower of FIG. 1A blowing air on to a target surface, in accordance with aspects of the disclosure.

FIG. 1F is a drawing of another example configuration of the example ionized air blower of FIG. 1A blowing air onto a target surface. The configuration of FIG. 1F is similar to the configuration of FIG. 1E except for the addition of another external sensor 120 that may be similar to the external sensor 116. In this configuration, the external sensor 120 may provide an initial feedback of the surface charge of the target surface 150. This information may be used for ionizing the airflow 153. The external sensor 116 may then provide information on the surface charge after the ionized airflow 153 blew over the target surface 150. The external sensor 116 enables additional correction to the ionization in the event that charge remains on the target surface 150 following ionization. Accordingly, the sensor 120 may be thought of as providing coarse correction and the external sensor 116 may be thought of as providing fine correction.

While information from the sensors 106, 116, and 120 is described as being transmitted via respective cables, the information from one or more of the sensors may also be transmitted to the control station 110 wirelessly.

Figure 2:
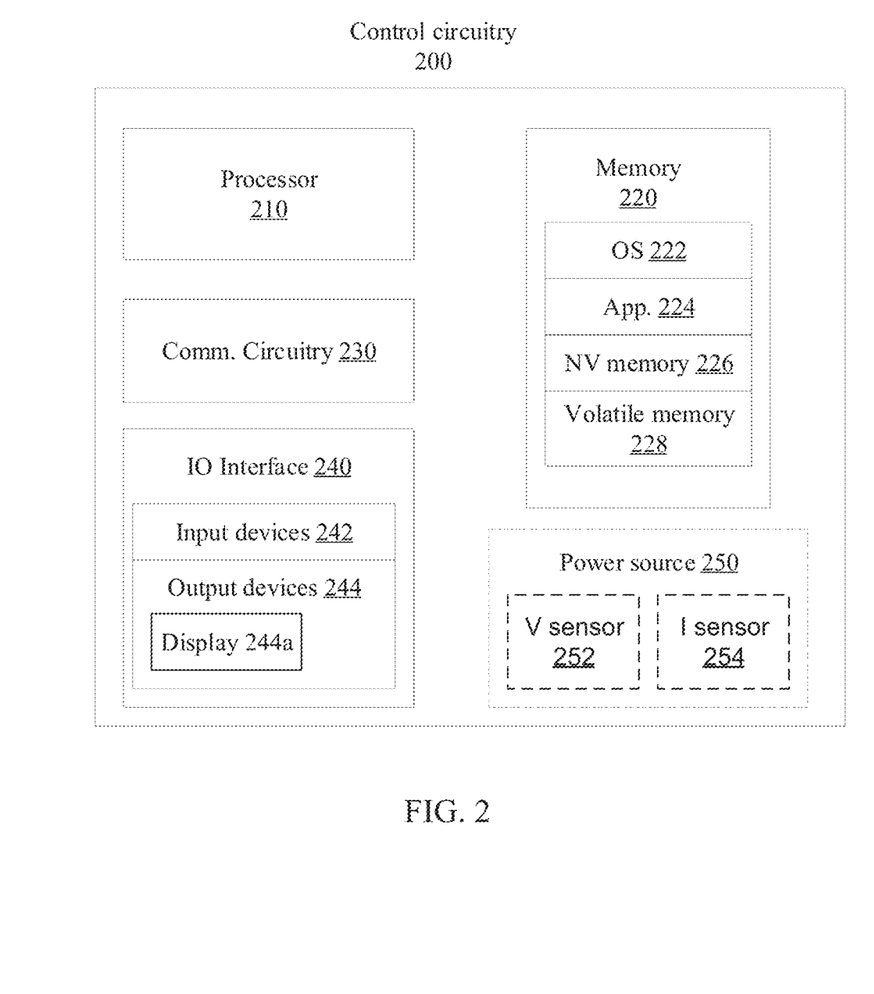
FIG. 2 is a drawing of an example control circuitry for an ionized air blower, in accordance with aspects of the disclosure.

FIG. 2 shows a block diagram of an example control circuitry in accordance with an embodiment of the disclosure. Referring to FIG. 2, there is shown an example control circuitry 200 that may be used with various embodiments of the disclosure. The control circuitry 200 may comprise, for example, a processor 210, memory 220, a communication circuitry 230, and an IO interface 240. A power source 250 may also be considered to be a part of the control circuitry 200. The processor 210 may comprise, for example, one or more processors and/or multiple cores per processor.

The memory 220 may include non-volatile memory 226 and volatile memory 228. The storage described for holding local data may be part of the memory 220 or comprise separate memory. The operating system 222 and applications 224 may be stored in, for example, the non-volatile memory 226, and may be copied to volatile memory 228 for execution by the processor 210. Various aspects of the disclosure may use different memory architectures that are design and/or implementation dependent. For example, some aspects of the disclosure may have the operating system 222 and applications 224 in the non-volatile memory 226 executed at least in part from the non-volatile memory 226.

The communication circuitry 230 may allow the control circuitry 200 to communicate with other devices via, for example, a wired protocol such as USB, Ethernet, Firewire, etc., or a wireless protocol such as Bluetooth, Near Field Communication (NFC), Wi-Fi, etc. The wired or wireless protocol may also be, for example, a proprietary protocol. The various types of radios for communication may be referred to as a transceiver for the sake of simplicity. The communication may be, for example, with various sensors and/or devices that can relay sensor data. The communication circuitry 230 may also be used to communicate with other networks such as local networks, cellular networks, etc.

The control circuitry 200 may also comprise the IO interface 240 for communication with a user via the input devices 242 (user interface 242) and output information to be displayed on output devices 244 that may comprise, for example, a display 244a. The input devices 242 may comprise, for example, switches, slide switches, buttons, potentiometers, touch sensitive screen, which may be a part of the display 244a, a microphone, etc. The touch sensitive screen may have soft buttons, switches, slide switches, etc. that emulate their physical counterparts. The input devices 242 may also comprise, for example, various sensors, cameras, etc. The output devices 244 may comprise, for example, the display, a speaker, LEDs, etc.

The processor 210 may operate using different architectures in different embodiments. For example, the processor 210 may use the memory 220 to store instructions to execute, and/or the processor 210 may have its own memory (not shown) and/or other storage device to store instructions.

Various embodiments may use other architectures where the different functionalities may be grouped differently. For example, a plurality of integrated circuit chips may be grouped into one integrated circuit chip. Additionally or alternatively, the grouping may combine different devices such as the IO interface 240 and the communication circuitry 230 together, etc. Additionally, the control circuitry 200 may refer logically to various physical devices. For example, one or more of the output devices 244 may be at a different location than one or more of the input devices 242.

While various physical devices, including a touch panel, may be used to control various functions of the ionized air blower 100, voice may also be used to give commands to control the various functions. The voice input may be received by, for example, a microphone that is a part of the input devices 242 of the control circuitry 200. The digitized commands may be processed by, for example, the processor 210 to determine the specific command. The specific command may then be used to control the ionized air blower 100. The software for voice recognition may be part of, for example, the operating system 222 and/or the applications 224 in the memory 220.

Additionally, while power sources may generally be grouped separately from the control circuitry 200, various aspects of the disclosure may group a power source with the control circuitry 200. For example, power received wirelessly or via wire may be considered to be a function of the I/O interface 240 where the input devices 242 receive the power and manages the power. Alternatively, the power source 250 may be a separate module responsible for receiving power input to the ionized air blower 100 and providing power to various modules of the ionized air blower 100.

FIG. 3A provides various views of an output section of an ionized air blower, in accordance with aspects of the disclosure. Referring to FIG. 3A, there is shown a perspective view 300A of an ionization assembly 300 comprising an ionizer 302 and the sensor 106. As stated above, the sensor 106 may comprise a sensor and a grille. View 300B is a top view of the ionization assembly 300. View 300C is a front view of the ionization assembly 300. View 300D is a side view of the ionization assembly 300.

The ionizer 302 may, for example, provide corona mode ionization to at least a portion of molecules that flow past the ionizer 302. The ionized air molecules may be generated by providing appropriate ionization voltage to the ionizer 302. The ionizer 302, when providing corona mode ionization, may comprise ion emitters 302A. The ionization voltage to the ion emitters 302A may be, for example, in a range of 4 KV to 10 KV. However, it should be noted that the ionization voltage range may vary depending on particular ionizer 302 used.

As shown in view 300E, when the sensor 106 is separate from the grille, the sensor 106-1 may be overlaid on the grille 106-2 where both devices may have similar dimensions as the air exit area 104. Some examples of the disclosure may have the grille 106-2 also be a sensor in addition to the sensor 106-1. In such an example, the sensor 106-1 may have a narrower range of adjustment than the sensor 106-2.

The sensor 106-1 may be used, for example, for ion balanced mode by the blower 100, and the sensor 106-2 may be used, for example, for ion imbalanced mode for static neutralization by the blower 100. The sensor 106-1 and/or sensor 106-2 may be smaller in at least one dimension than the air exit area 104. For example, the sensor 106-1 and/or the sensor 106-2 may be rod-shaped extending in the horizontal direction across the air exit area 104.

As a sensor is well-known to those skilled in the art, the specific details of the sensor 106-1 and/or 106-2 will not be further described.

Various aspects of the disclosure may provide for a user to be able to replace the ionization assembly 300 in part or in whole. For example, depending on a particular implementation, the user may be able to replace one or more components of the ionization assembly 300. When one or more parts of the ionization assembly 300 is disconnected in preparation for removal, the blower control circuitry 101 may disable the fan 400, and the blower control circuitry 101 may also, for example, disable power to the ionizer 302.

Information from the sensor 106 (or the sensor 106-1) and/or the information from the external sensor 116 may be used to control ionization of air passing through the air ionizer blower 100. As the sensor 106 may have a wider sensing range (for example, voltage range) than the external sensor 116, the information from the sensor 106 may be used as, for example, coarse granularity information, and the information from the external sensor 116 may be used as, for example, fine granularity information.

Various aspects of the disclosure may provide for the air ionizer blower 100 with various modes of operation. For example, a first mode may be the ion imbalanced mode for static neutralization of the target surface 150, and a second mode may be the ion balanced mode. When in the ion imbalanced mode, the information from the external sensor 116 may be used to determine the surface charge of the target surface 150, which may be moving from left to right as shown in by the arrow 151 in FIGS. 1E and 1F. The sensor external 116 may provide information to the air ionizer blower 100 via a cable 118 (and cable 122 in FIG. 1F). This information is used to adjust the ionization of air directed from the air ionizer blower 100 to the target surface 150 to neutralize the static charge that may be present on the target surface 150. The ratio of positive ions to negative ions may be adjusted as needed to achieve neutral surface charge for the target surface 150.

While this feedback mechanism may use the information from the external sensor 116 (and the external sensor 120 as disclosed by other aspects of the disclosure), the information from the external sensor 120 may also be used to further adjust the ion ratio in the airflow from the air ionizer blower 100. That is, the information from the external sensor 116 provides the surface charge after the ionized air has flowed over the target surface 150 and the information from the sensor 106 provides the ion ratio of the air flowing to the target surface 150.

Various aspects of the disclosure may provide for using statistical, mathematical, or other methods to monitor control signals for oscillation of control, and provide alert warning and restart as required.

When the information from the external sensor 116 indicates that the target surface charge is neutralized, the ion ratio may be maintained until the surface charge of the target surface 150 has varied beyond a threshold value. For example, when the surface charge is greater than a first threshold, the control circuitry 200 may control the ionizer 302 to increase a ratio of the negative ions to the positive ions. When the surface charge is less than a second threshold, the control circuitry 200 may control the ionizer 302 to decrease the ratio of the negative ions to the positive ions. When the surface charge is substantially neutral, the control circuitry 200 may control the ionizer to maintain a present ratio (last set ratio) of negative ions to positive ions. The first and second thresholds may have default values that may be changed dynamically.

The ion balanced mode may be used to keep the ratio of positive ions to negative ions constant. Accordingly, the external sensor 116 may not be needed since the surface charge is not needed. While the ratio may typically be substantially 50-50, various aspects of the disclosure may allow the ratio to be set to a different ratio. It should be understood that a resulting ratio of ions in the airflow may approximate the desired ratio. The ratio, or balance, of negative ions to positive ions may be entered via the input devices 242. The entry may be made via, for example, a touch sensitive screen, a keyboard, a mouse, by turning a potentiometer, etc.

A range of the ratio may be, for example, software controlled to allow displaying of different ranges at different times. For example, when entry is made by turning the potentiometer, the range may be limited to a specific voltage range. That is, while an ionization voltage may range from, for example, 4 KV to 10 KV, calibration may determine that the actual voltage range may only need to be from, for example, 6 KV to 8 KV. Accordingly, the ionized air blower 100 may have an n-turn potentiometer that is effectively configured to provide a range of, for example, 6 KV to 8 KV rather from 4 KV to 10 KV. Therefore, voltage selection can be more accurately selected when the potentiometer is adjusted. Since this is software controlled, each ionized air blower 100 is capable of individual configuration.

The ionizer 302 may receive ionization voltage from the power source 250 and also ionization current from the power source 250. The power source 250 may comprise, for example, an output voltage sensor 252 and an output current sensor 254. The output voltage sensor 252 may be able to detect positive polarity and/or negative polarity of the output voltage, and the output current sensor 254 may be able to detect positive polarity and/or negative polarity of the output current. Some examples of the disclosure may use multiple output voltage sensors 252 to detect positive and negative polarity of the output voltage, and multiple output current sensors 254 to detect positive and negative polarity of the output current.

Accordingly, the power source 250 may determine the ionization current and the ionization voltage provided to the ionizer 302.

Figure 4:
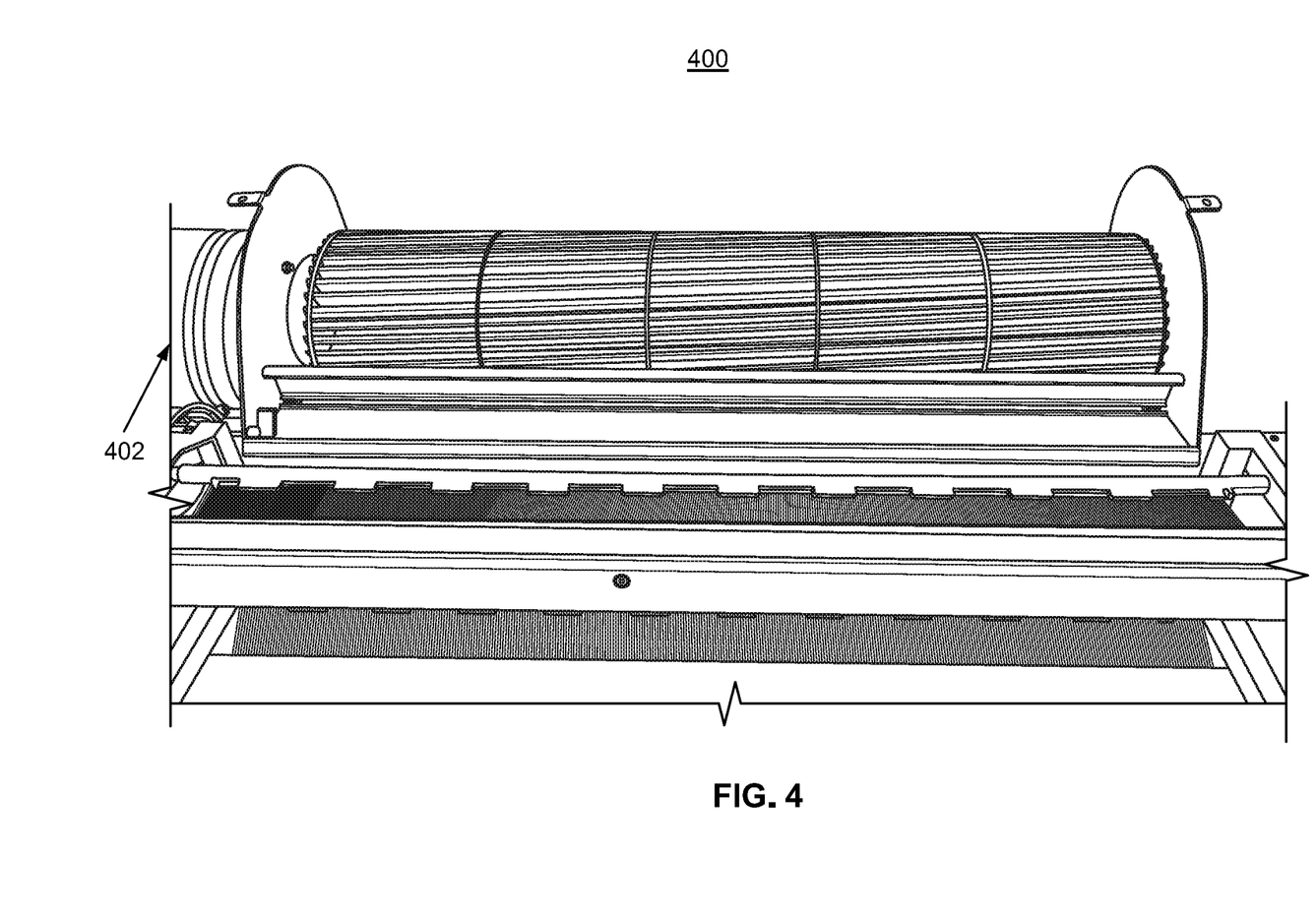
FIG. 4 illustrates an example fan of an ionized air blower, in accordance with aspects of the disclosure.

While an automated method was described for controlling the blower 300, various aspects of the disclosure may allow manually controlling the blower 300. For example, the blower 300 may comprise a display 244*a* as a part of the control circuitry 200. The display 200 may display the target surface charge from the external sensor 116. An operator may then adjust the ratio of positive ions to negative ions using, for example, the input devices 242. The operator may also adjust the airflow by controlling the speed of the fan 400 (FIG. 4).

Other aspects of the disclosure may have the processor 210 use the target surface charge, present ratio (last set ratio) of positive ions to negative ions, and/or speed of the fan 400 to display on, for example, the display 244*a*, the appropriate ratio and/or fan speed to set using one or more of the input devices 242.

Figure 3B:
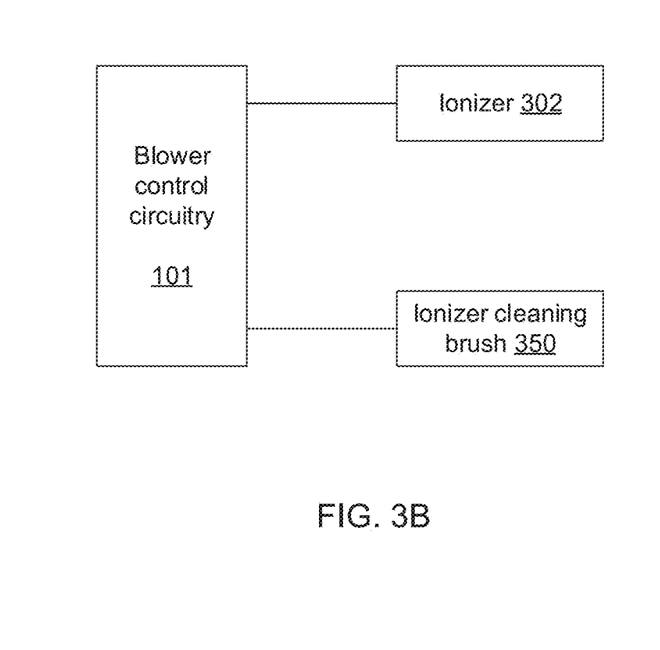
FIG. 3B is a drawing of an example configuration of an ionizer cleaning brush and an ionizer, in accordance with aspects of the disclosure.

FIG. 3B is a drawing of an example configuration of an ionizer cleaning brush and an ionizer. Referring to FIG. 3B, the ionized air blower 100 may comprise an ionizer cleaning brush 350 that can be actuated to clean the ionizer 302. In an aspect of the disclosure, the blower control circuitry 101 may actuate the ionizer cleaning brush 350 to clean the ion emitters 302A of the ionizer 302 with an input to a human-machine interface 360 for the ionized air blower 100, via a control station 362, via a programmable logic controller (PLC) 364, or upon startup of the ionized air blower. The cleaning brush 350 may also be manually actuated via, for example, the input devices 242.

Figure 3C:
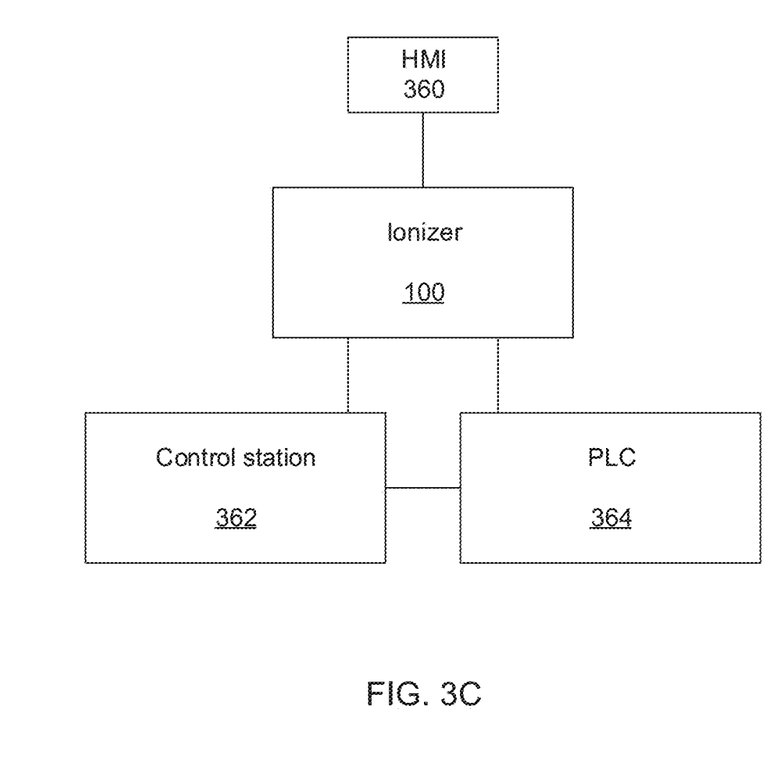
FIG. 3C is a drawing of an example configuration of an ionizer, in accordance with aspects of the disclosure.

FIG. 3C is a drawing of an example configuration of an ionizer. Referring to FIG. 3C, there is shown the ionized air blower 100, a human-machine interface (HMI) 360, a control station 362, and the PLC 364. The HMI 360 may be an input/output device connected to the ionized air blower 100 to input commands to the ionized air blower 100 and/or display status of the ionized air blower 100. The HMI 360 may be, for example, part of the I/O interface 240.

The control station 362 may be a device that controls one or more devices such as, for example, the ionized air blower 100, the external sensor 116, industrial devices used in an manufacturing line or a section of a factory, etc. The PLC 364 may be a similar control device overseeing equipment in a section of a factory, manufacturing line, etc. The control station 362 and/or the PLC 364 may each have a corresponding HMI to allow manual input.

Accordingly, any of the HMI 360, the control station 362, and the PLC 364 may be used to actuate the ionizer cleaning brush 350 to clean the ionizer 302. Furthermore, the ionized air blower 100 may be configured to actuate the ionizer cleaning brush 350 upon startup of the ionized air blower 100 and/or periodically during operation of the ionized air blower 100. Additionally, when the ionization current 302 drops below an ion current threshold, the blower control circuitry 101 may actuate the ionizer cleaning brush 350. The ion current threshold may have a default value, but the threshold may be changed by the user, or, for example, by the type of ionizer 302 used.

Various aspects of the disclosure may provide for the ionized air blower 100 to cease generating ions during a cleaning phase by the ionizer cleaning brush 350 while other aspects of the disclosure allows the ionized air blower 100 to continue generating ions during the cleaning phase. The duration of the cleaning phase may have a default time. However, the default time may be changed by the user, or automatically by the control circuitry 200 depending on the type of ionizer 302 used.

The HMI 360, the control station 362, and/or the PLC 364 may control some or all functions of the ionized air blower 100 directly or indirectly. For example, the PLC 364 may communicate instructions to the HMI 360 or to the control station 362 to control the ionized air blower 100. Similarly, the HMI 360 or the control station 362 may communicate instructions to the other devices to control the ionized air blower 100.

FIG. 4 illustrates an example fan of an ionized air blower, in accordance with aspects of the disclosure. While a tangential style blower is shown for the fan 400, any of various other types of fans/blowers may be used. A fan motor 402 may drive the fan 400. The fan motor 402 may receive power from the power source 250, and may be controlled by the control circuitry 200. The HMI 360 may be able to detect whether power is available at the fan motor 402. Upon detection of no power for the fan motor 402, the HMI 360 can output an alert. The alert may be any of audible, visual, and/or tactile alert. In some examples of the disclosure, the fan motor 402 may use AC power, and may get the AC power directly from a source such as an AC outlet, or the AC power from the power source 250.

Accordingly, it can be seen that various aspects of the disclosure provide for an ionized air blower 100 comprising a fan 400 configured to generate an airflow toward a target surface 150, an ionizer 302 configured to produce positive ions and negative ions in the airflow; and control circuitry 200 configured to control one or both of a speed of the airflow from the ionized air blower 100, and ionization of the airflow. The ionization is performed by a selected one of ion imbalanced mode for static neutralization of the target surface or ion balanced mode.

The ionized air blower 100 may comprise a first sensor 116 configured to detect a surface charge of the target surface 150, where, when the ion imbalanced mode is selected, the control circuitry 200 is configured to control the ionizer 302 based on the detected surface charge from the first sensor 116. The first sensor 116 may be, for example, an electro-static voltmeter, an electro-static field meter, or any other sensor or type of sensor that may be used to detect a surface charge, whether presently known or developed in the future.

The ionized air blower 100 may further comprise a second sensor 106-1 configured to detect a charge of the airflow generated by the ionized air blower 100. The second sensor 106-1 may be at least a part of a grille 106-2 where the airflow exits the ionized air blower 100. The second sensor 106 may have a wider sensing range than the first sensor 116.

When the surface charge is greater than a first threshold, a ratio of the negative ions to the positive ions may be increased. When the surface charge is lesser than a second threshold, the ratio of the negative ions to the positive ions may be decreased. When the surface charge is substantially neutral, the control circuitry 200 may be configured to control the ionizer 302 to maintain a present ratio (last set ratio) of negative ions to positive ions.

The ionized air blower 100 may comprise a control station 110 configured to receive the detected surface charge via one of a wireless connection or a wired connection. The control station 110 may comprise a connector 115 to receive a signal cable 118 from the first sensor 116.

The ionizer 302 may comprise a user replaceable corona ionizer 302 with at least one ion emitter 302A. The ionized air blower 100 may comprise an ionization assembly 300 comprising a sensor 106-1, a grille 106-2, and an ionizer 302, where the ionization assembly 300 is user replaceable.

The control circuitry 200 may be configured to disable the fan 400 when the ionization assembly 300 is disconnected from the ionized air blower 100. The fan 400 may be a tangential style blower.

The ionized air blower 100 may further comprise an ionizer cleaning brush 350 configured to clean the ionizer 302. The ionizer cleaning brush 350 may be configured to be manually actuated via a human-machine interface 360 for the ionized air blower 100, or automatically actuated via a programmable logic controller 364 or upon startup of the ionized air blower 100.

The ionized air blower 100 may further comprise an ionizer 302 and a power source 250 to provide ion current for the ionizer 302. The ionized air blower may further comprise an ionizer cleaning brush 350 configured to be actuated to clean the ionizer 302. The ionizer cleaning brush 350 may be configured to be actuated when the ion current is below an ion current threshold.

The ionizer cleaning brush 350 may be configured to clean the ionizer 302 for a time interval, where the time interval has a default time interval. The time interval may be variable.

The ionized air blower of claim 1, wherein the ionized air blower 100 may be configured to be controlled by one or both of a human-machine interface 360 for the ionized air blower 100 and a programmable logic controller 364.

The ionized air blower 100 is configured to be controlled by a human-machine interface 360 for the ionized air blower 100 via instructions from a programmable logic controller 364 to the human-machine interface 360.

The control circuitry 200 comprises an input device 242 for balance adjustment of the ionization of the air, where a range of the input device 242 is variable using software mapping. The input device 242 comprises a potentiometer.

The ionized air blower 100 may comprise a blower motor 402 to drive the fan 400, and a human-machine interface 360, where the control circuitry 200 is configured to provide information to the human-machine interface 360 regarding whether power is available at the blower motor 402.

Other aspects of the disclosure may provide for an ionized air blower 100 comprising a fan 400 configured to generate an airflow toward a target surface 150, an ionizer 302 configured to produce a ratio of positive ions to negative ions within the airflow where the ratio can be adjusted, a sensor 116 configured to determine a surface charge present on the target surface 150, and control circuitry 200. The control circuitry 200 may be configured to control a speed of the airflow from the fan 400, and control the ionizer 302 to generate the ratio of positive ions to the negative ions based on the surface charge detected by the sensor 116.

When the surface charge is positive, the control circuitry 200 is configured to control the ionizer 302 to decrease the ratio of the positive ions to the negative ions. When the surface charge is negative, the control circuitry 200 is configured to control the ionizer 302 to increase the ratio of the positive ions to the negative ions. When the surface charge is substantially neutral, the control circuitry 200 is configured to control the ionizer 302 to maintain a present ratio (last set ratio) of the positive ions to the negative ions.

Still other aspects of the disclosure may provide for an ionized air blower 100 comprising a fan 400 configured to generate airflow toward a target surface 150, an ionizer 302 configured to produce a ratio of positive ions to negative ions within the airflow, where the ratio can be adjusted, a sensor 116 configured to determine a surface charge present on the target surface 150, a display 244a for displaying the surface charge, and a user interface 242 configured to receive user input. The user interface 242 may be configured to accept input to control a speed of the airflow from the fan 400 and control the ionizer to adjust the ratio of the positive ions to the negative ions.

As utilized herein, the terms "circuits" and "circuitry" refer to physical electronic components (i.e. hardware) and any software and/or firmware ("code") that may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "configured" or "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized using a combination of hardware and software. The present methods and/or systems may be realized in a centralized fashion in at least one computing system or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What are claimed:

1. An ionized air blower comprising:
   a fan configured to generate airflow toward a target surface;
   an ionizer configured to produce positive ions and negative ions in the airflow;
   control circuitry configured to control one or both of:
      a speed of the airflow from the blower;
      ionization of the airflow, wherein the control circuitry is configured to perform ionization in:
         an ion imbalanced mode, or
         an ion balanced mode;
   a human-machine interface (HMI) operably coupled with the control circuitry; and
   a blower motor configured to drive the fan, wherein the control circuitry is configured to provide information to the human-machine interface regarding whether power is available at the blower motor.

2. The ionized air blower of claim 1, further comprising a first sensor configured to detect a surface charge of the target surface, wherein, when the ion imbalanced mode is selected, the control circuitry is configured to control the ionizer based on the detected surface charge from the first sensor.

3. The ionized air blower of claim 2, further comprising a second sensor configured to detect a charge of the airflow generated by the ionized air blower.

4. The ionized air blower of claim 3, wherein the second sensor is a part of a sensor assembly where the airflow exits the ionized air blower.

5. The ionized air blower of claim 3, wherein the second sensor has a wider sensing range than the first sensor.

6. The ionized air blower of claim 2, wherein:
   when the surface charge is greater than a first threshold, the control circuitry is configured to control the ionizer to increase a ratio of the negative ions to the positive ions,
   when the surface charge is smaller than a second threshold, the control circuitry is configured to control the ionizer to decrease the ratio of the negative ions to the positive ions, and
   when the surface charge is substantially neutral, the control circuitry is configured to control the ionizer to maintain a last set ratio of negative ions to positive ions.

7. The ionized air blower of claim 1, wherein the ionized air blower is configured to be controlled by one or both of a human-machine interface for the ionized air blower and a programmable logic controller.

8. The ionized air blower of claim 1, wherein the ionized air blower is configured to be controlled by a human-machine interface for the ionized air blower via instructions from a programmable logic controller to the human-machine interface.

9. The ionized air blower of claim 1, wherein the control circuitry comprises an input device for balance adjustment of the ionization of the air, wherein a range of the input device is variable using software mapping.

10. The ionized air blower of claim 1, wherein, upon information of no power to the blower motor, the HMI provides an alert.

11. An ionized air blower comprising:
    a fan configured to generate airflow toward a target surface;
    an ionizer configured to produce positive ions and negative ions in the airflow; and
    control circuitry configured to control one or both of:
       a speed of the airflow from the blower;
       ionization of the airflow, wherein the ionization is performed by a selected one of:
          ion imbalanced mode, or
          ion balanced mode; and
       a control station configured to receive the detected surface charge via one of a wireless connection or a wired connection.

12. An ionized air blower comprising:
    a fan configured to generate airflow toward a target surface;
    an ionizer configured to produce positive ions and negative ions in the airflow; and
    control circuitry configured to control one or both of:
       a speed of the airflow from the blower;
       ionization of the airflow, wherein the ionization is performed by a selected one of:
          ion imbalanced mode, or
          ion balanced mode; and
    an ionization assembly comprising a grille, a sensor assembly, and an ionizer.

13. The ionized air blower of claim 12, further comprising an ionizer cleaning brush configured to clean the ionizer.

14. The ionized air blower of claim 13, wherein the ionizer cleaning brush is configured to be actuated manually via a human-machine interface for the ionized air blower, via a programmable logic controller, or upon startup of the ionized air blower.

15. The ionized air blower of claim 13, wherein the ionizer cleaning brush is configured to be actuated when an ion current for the ionizer is below an ion current threshold.

16. An ionized air blower comprising:
a human-machine interface (HMI);
a fan configured to generate airflow toward a target surface;
an ionizer configured to produce a ratio of positive ions to negative ions within the airflow where the ratio can be adjusted via the HMI;
a sensor configured to determine a surface charge present on the target surface;
control circuitry configured to:
control a speed of the airflow from the blower; and
control the ionizer to adjust the ratio of the positive ions to the negative ions based on the surface charge detected by the sensor; and
a control station configured to receive the detected surface charge via one of a wireless connection or a wired connection.

17. The ionized air blower of claim 16, wherein:
when the surface charge is positive, the control circuitry is configured to control the ionizer to decrease the ratio of the positive ions to the negative ions,
when the surface charge is negative, the control circuitry is configured to control the ionizer to increase the ratio of the positive ions to the negative ions, and
when the surface charge is substantially neutral, the control circuitry is configured to control the ionizer to maintain a last set ratio of the positive ions to the negative ions.

18. An ionized air blower comprising:
a fan configured to generate airflow toward a target surface;
an ionizer configured to produce a ratio of positive ions to negative ions within the airflow where the ratio can be adjusted;
a sensor configured to determine a surface charge present on the target surface;
a display for displaying the surface charge; and
a user interface configured to receive user input.

19. The ionized air blower of claim 18, wherein the user interface is configured to accept input to:
control a speed of the airflow from the fan; and
control the ionizer to adjust the ratio of the positive ions to the negative ions.

\* \* \* \* \*